(12) United States Patent
Huh

(10) Patent No.: US 12,158,526 B2
(45) Date of Patent: Dec. 3, 2024

(54) SYSTEM AND METHOD FOR TRACKING VEHICLE

(71) Applicant: HYUNDAI MOBIS CO., LTD., Seoul (KR)

(72) Inventor: Jung Kyun Huh, Yongin-si (KR)

(73) Assignee: Hyundai Mobis Co., Ltd., Seoul (KR)

( * ) Notice: Subject to any disclaimer, the term of this patent is extended or adjusted under 35 U.S.C. 154(b) by 121 days.

(21) Appl. No.: 17/684,559

(22) Filed: Mar. 2, 2022

(65) Prior Publication Data

US 2022/0283312 A1 Sep. 8, 2022

(30) Foreign Application Priority Data

Mar. 8, 2021 (KR) .................. 10-2021-0030092

(51) Int. Cl.
*G01S 17/931* (2020.01)
*B60W 30/095* (2012.01)
*G01S 17/08* (2006.01)

(52) U.S. Cl.
CPC ....... *G01S 17/931* (2020.01); *B60W 30/0956* (2013.01); *G01S 17/08* (2013.01); *B60W 2420/403* (2013.01); *B60W 2420/408* (2024.01)

(58) Field of Classification Search
CPC ... B60Q 5/006; B60W 30/0956; B60W 30/12; B60W 50/032; B60W 2420/42; B60W 2420/52; G01S 7/026; G01S 7/4814; G01S 7/4817; G01S 7/486; G01S 13/723; G01S 13/862; G01S 13/865; G01S 13/867; G01S 13/931; G01S 15/66; G01S 15/931; G01S 17/08; G01S 17/42; G01S 17/66; G01S 17/89; G01S 17/931; G01S 2013/9323; G01S 2013/9324; G05D 1/0212; G08G 1/017; G08G 1/04; G08G 1/161
USPC ........................................ 340/435
See application file for complete search history.

(56) References Cited

U.S. PATENT DOCUMENTS

| | | | | |
|---|---|---|---|---|
| 3,736,376 A * | 5/1973 | Kato, Jr. | ............... | G01S 3/7864 250/203.5 |
| 4,549,211 A * | 10/1985 | Assael | ............... | G01S 17/66 348/171 |
| 5,369,590 A * | 11/1994 | Karasudani | ............. | G01S 11/12 701/96 |
| 5,530,771 A * | 6/1996 | Maekawa | ................ | G01S 5/16 382/104 |
| 6,133,866 A * | 10/2000 | Kanter | ................ | G01S 13/4463 342/149 |

(Continued)

FOREIGN PATENT DOCUMENTS

| | | | | |
|---|---|---|---|---|
| EP | 1531343 A1 * | 5/2005 | ............. | G01S 17/66 |
| KR | 10-1997-0076345 A | 12/1997 | | |
| KR | 20200085982 A * | 7/2020 | ............. | B60K 35/00 |

*Primary Examiner* — Stephen R Burgdorf
(74) *Attorney, Agent, or Firm* — NSIP Law

(57) ABSTRACT

A vehicular tracking system and a method are provided. The system includes: a sensor configured to emit a sensor beam toward a vehicle to be tracked; an information calculator configured to calculate, through the sensor, sensor beam emission information and movement information of the vehicle to be tracked; and a tracking setter configured to receive the movement information and the emission information from the information calculator and set, through the movement information and the emission information, a tracking gate for the vehicle to be tracked.

15 Claims, 2 Drawing Sheets

(56) References Cited

U.S. PATENT DOCUMENTS

| | | | |
|---|---|---|---|
| 2003/0069695 A1* | 4/2003 | Imanishi | G01S 11/12 348/148 |
| 2011/0163909 A1* | 7/2011 | Jeong | H01Q 25/002 342/374 |
| 2014/0159925 A1* | 6/2014 | Mimeault | G01S 17/86 340/935 |
| 2014/0191951 A1* | 7/2014 | Ye | G06T 11/00 345/156 |
| 2016/0023598 A1* | 1/2016 | Kohler | G01S 13/931 340/435 |
| 2017/0025015 A1* | 1/2017 | Thompson | G08G 1/166 |

* cited by examiner

SYSTEM AND METHOD FOR TRACKING VEHICLE

CROSS-REFERENCE TO RELATED APPLICATION(S)

This application claims the benefit under 35 USC § 119(a) of Korean Patent Application No. 10-2021-0030092, filed on Mar. 8, 2021, in the Korean Intellectual Property Office, the entire disclosure of which is incorporated herein by reference for all purposes.

BACKGROUND

1. Field

The following disclosure relates to a system and a method for tracking a vehicle.

2. Description of Related Art

Vehicle tracking sensors are used to prevent vehicle contact accidents, to recognize other vehicles around a vehicle, or in other various cases. A typical tracking algorithm that implements a beam emission sensor uses the vehicle traveling direction to set a tracking gate with regard to the vehicle to be tracked, thereby tracking the vehicle.

However, such settings of a tracking gate by using vehicle heading have a problem in that the tracking gate may be set wider than the actual area of reflection of the beam by the vehicle, and the tracking gate wider than the actual area of reflection is easily contaminated by beam reflection or other objects if the vehicle peripheral environment is complicated, or if many obstacles exist around the vehicle, thereby generating severe noise.

Therefore, there is a need to develop a vehicle tracking system wherein not only vehicle heading, but also emission information of a beam emitted to a vehicle are used to set a tracking gate such that an optimized tracking gate is set, noise is thus removed, and the vehicle can thus be tracked accurately even in a complicated environment.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In a general aspect, a vehicle tracking system includes a sensor configured to emit a sensor beam toward a vehicle to be tracked; an information calculator configured to calculate sensor beam emission information, and movement information of the vehicle to be tracked; and a tracking setter configured to receive the movement information and the emission information from the information calculator and set a tracking gate for the vehicle to be tracked.

The information calculator may be configured to calculate the sensor beam emission information and movement information of the vehicle to be tracked based on data received from the sensor.

The sensor may be configured to emit the sensor beam toward the vehicle to be tracked, and the sensor may include at least one of a radar sensor, a LiDAR sensor, an ultrasonic sensor, and an image sensor.

The tracking gate may include a longitudinal gate and a transverse gate, and the tracking setter may be configured to receive a longitudinal size and a transverse size of the tracking gate based on the movement information and the emission information to set the tracking gate for the vehicle to be tracked.

The sensor beam emission information may include information about an angle of a sensor beam that forms a shortest distance with the vehicle to be tracked, among multiple sensor beams emitted toward the vehicle to be tracked.

The movement information of the vehicle to be tracked may include information about a full length and a full width of the vehicle to be tracked, or information about a traveling direction of the vehicle to be tracked.

The sensor may be disposed in a vehicle or an infrastructure, and the tracking setting is configured to set a tracking gate for the vehicle to be tracked around the vehicle or the infrastructure.

The infrastructure may be a fixed site comprising at least one of a parking lot, a road, a tollgate, and a gas station, and the sensor may be disposed to face an area through which surrounding vehicles pass, at the fixed site.

The tracking setter may be configured to set at least one tracking gate for at least one vehicle to be tracked; and track, based on the at least one set tracking gate, the at least one vehicle to be tracked.

In a general aspect, a vehicle tracking method includes emitting a sensor beam toward a vehicle to be tracked; calculating sensor beam emission information and movement information of the vehicle to be tracked; and setting a tracking gate for the vehicle to be tracked based on the calculated movement information and the calculated emission information.

The sensor beam may be configured to be emitted toward the vehicle to be tracked, through a sensor which is arranged in one of a vehicle and an infrastructure, and the sensor may include at least one of a radar sensor, a LiDAR sensor, an ultrasonic sensor, and an image sensor.

The tracking gate may include a longitudinal gate and a transverse gate, and, the tracking gate for the vehicle to be tracked may be set by receiving a longitudinal size and a transverse size of the tracking gate based on the movement information and the emission information.

The vehicle to be tracked may be tracked by implementing the set tracking gate after the tracking setting operation.

Other features and aspects will be apparent from the following detailed description, the drawings, and the claims.

BRIEF DESCRIPTION OF THE DRAWINGS

Throughout the drawings and the detailed description, the same reference numerals refer to the same elements. The drawings may not be to scale, and the relative size, proportions, and depiction of elements in the drawings may be exaggerated for clarity, illustration, and convenience.

DETAILED DESCRIPTION

Figure 1:
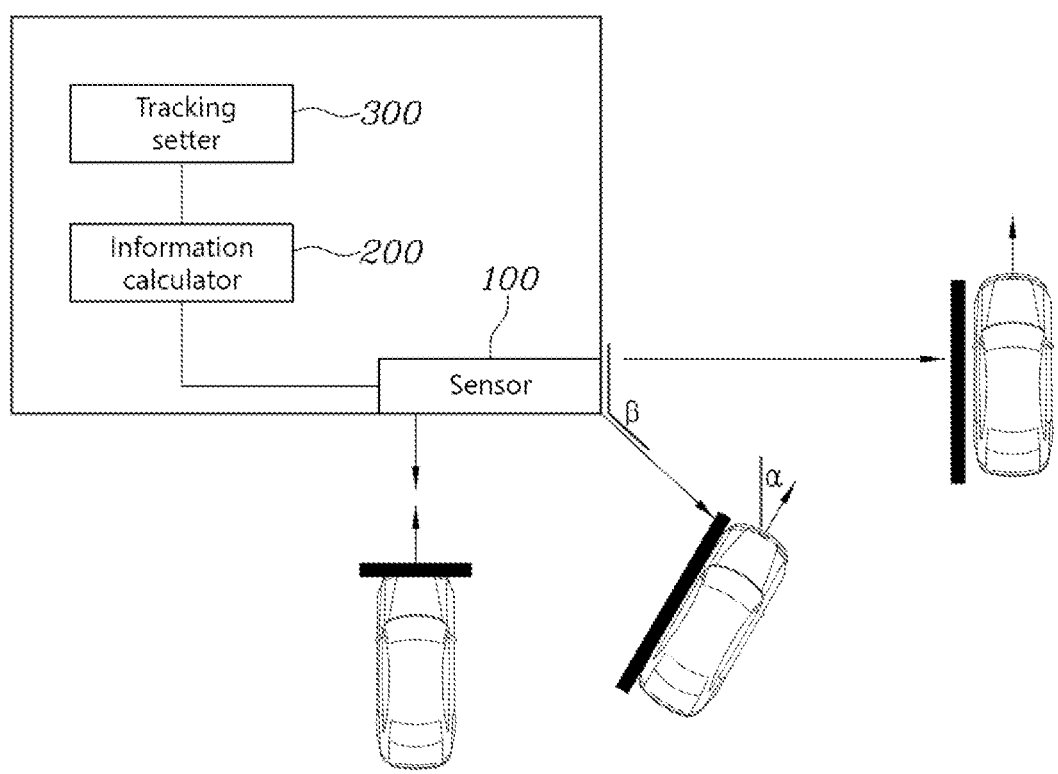
FIG. 1 illustrates an example vehicle tracking system, in accordance with one or more embodiments.

The following detailed description is provided to assist the reader in gaining a comprehensive understanding of the methods, apparatuses, and/or systems described herein. However, various changes, modifications, and equivalents of the methods, apparatuses, and/or systems described herein will be apparent after an understanding of the disclosure of this application. For example, the sequences of operations described herein are merely examples, and are not limited to those set forth herein, but may be changed as will be apparent after an understanding of the disclosure of this application, with the exception of operations necessarily occurring in a certain order. Also, descriptions of features that are known after an understanding of the disclosure of this application may be omitted for increased clarity and conciseness, noting that omissions of features and their descriptions are also not intended to be admissions of their general knowledge.

The features described herein may be embodied in different forms, and are not to be construed as being limited to the examples described herein. Rather, the examples described herein have been provided merely to illustrate some of the many possible ways of implementing the methods, apparatuses, and/or systems described herein that will be apparent after an understanding of the disclosure of this application.

Although terms such as "first," "second," and "third" may be used herein to describe various members, components, regions, layers, or sections, these members, components, regions, layers, or sections are not to be limited by these terms. Rather, these terms are only used to distinguish one member, component, region, layer, or section from another member, component, region, layer, or section. Thus, a first member, component, region, layer, or section referred to in examples described herein may also be referred to as a second member, component, region, layer, or section without departing from the teachings of the examples.

The terminology used herein is for the purpose of describing particular examples only, and is not to be used to limit the disclosure. As used herein, the singular forms "a," "an," and "the" are intended to include the plural forms as well, unless the context clearly indicates otherwise. As used herein, the term "and/or" includes any one and any combination of any two or more of the associated listed items. As used herein, the terms "include," "comprise," and "have" specify the presence of stated features, numbers, operations, elements, components, and/or combinations thereof, but do not preclude the presence or addition of one or more other features, numbers, operations, elements, components, and/or combinations thereof.

In addition, terms such as first, second, A, B, (a), (b), and the like may be used herein to describe components. Each of these terminologies is not used to define an essence, order, or sequence of a corresponding component but used merely to distinguish the corresponding component from other component(s).

Throughout the specification, when an element, such as a layer, region, or substrate, is described as being "on," "connected to," or "coupled to" another element, it may be directly "on," "connected to," or "coupled to" the other element, or there may be one or more other elements intervening therebetween. In contrast, when an element is described as being "directly on," "directly connected to," or "directly coupled to" another element, there can be no other elements intervening therebetween. Likewise, expressions, for example, "between" and "immediately between" and "adjacent to" and "immediately adjacent to" may also be construed as described in the foregoing.

Unless otherwise defined, all terms, including technical and scientific terms, used herein have the same meaning as commonly understood by one of ordinary skill in the art to which this disclosure pertains and after an understanding of the disclosure of this application. Terms, such as those defined in commonly used dictionaries, are to be interpreted as having a meaning that is consistent with their meaning in the context of the relevant art and the disclosure of this application, and are not to be interpreted in an idealized or overly formal sense unless expressly so defined herein.

Also, in the description of example embodiments, detailed description of structures or functions that are thereby known after an understanding of the disclosure of the present application will be omitted when it is deemed that such description will cause ambiguous interpretation of the example embodiments.

Hereinafter, examples will be described in detail with reference to the accompanying drawings, and like reference numerals in the drawings refer to like elements throughout.

In one or more examples, emission information of a sensor beam emitted towards a vehicle to be tracked and movement information of the vehicle to be tracked are used to set a tracking gate optimized for the vehicle to be tracked, thereby tracking the vehicle to be tracked.

In an example, emission information of a sensor beam emitted towards a vehicle to be tracked and movement information of the vehicle to be tracked may be used to set a tracking gate optimized for the vehicle to be tracked, thereby tracking the vehicle to be tracked more precisely.

Figure 2:
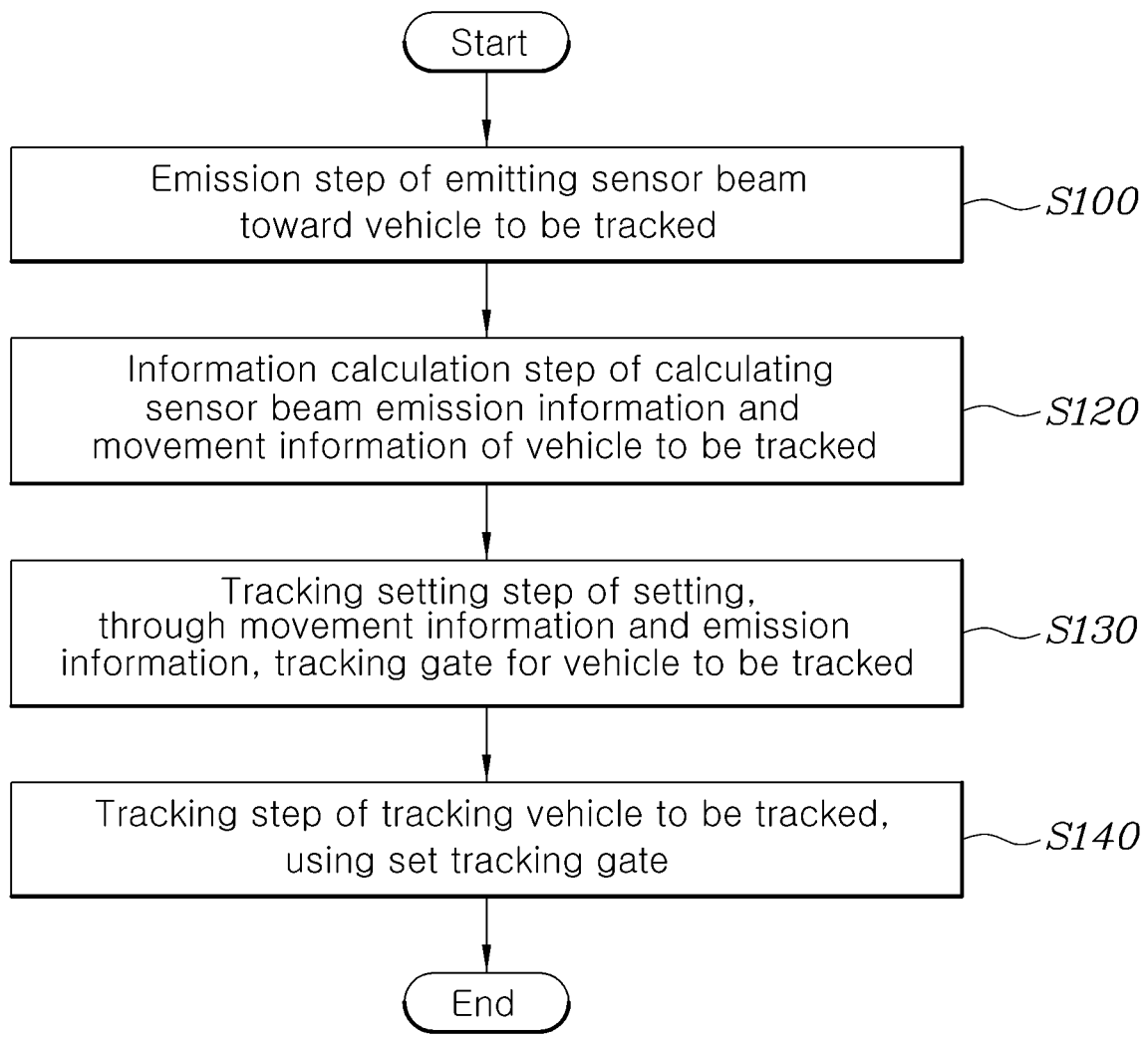
FIG. 2 is a flowchart illustrating an example vehicle tracking method, in accordance with one or more embodiments.

FIG. 1 illustrates a vehicle tracking system, in accordance with one or more embodiments. FIG. 2 is a flowchart illustrating a vehicle tracking method, in accordance with one or more embodiments.

FIG. 1 illustrates a vehicle tracking system, in accordance with one or more embodiments. The vehicle tracking system includes: a sensor 100 configured to emit a sensor beam toward a vehicle to be tracked; an information calculator 200 configured to calculate, through the sensor 100, sensor beam emission information and movement information of the vehicle to be tracked; and a tracking setter 300 configured to receive the movement information and the emission information from the information calculator 200 and set, through the movement information and the emission information, a tracking gate for the vehicle to be tracked.

In the case of a typical vehicle tracking system using a beam emission sensor, a tracking gate is set by using only the heading of a vehicle. Thus, the tracking gate may be set to be larger than the area of an actual beam reflected in proportion to the entire size of the vehicle. Therefore, other obstacles or foreign matter, in addition to an actual beam reflected by a vehicle to be tracked, are reflected, and thus a tracking gate may be easily polluted by noise; the system may not recognize the speed or direction of the vehicle to be tracked, and thus may not accurately track the vehicle to be tracked; and an accident may occur or the system may malfunction.

Accordingly, the vehicle tracking system according to an embodiment of the present disclosure can use the heading of a vehicle to be tracked and beam emission information of a sensor to optimize the size of a tracking gate to be as close as possible to the area of an actual beam reflected by the vehicle to be tracked, thereby improving the accuracy of tracking, and, in particular, accurately tracking a vehicle to be tracked even in an environment in which reflection is severe or a cluttered environment in which there are many objects.

In the vehicle tracking system according to an embodiment of the present disclosure, the sensor 100 may emit a sensor beam toward the vehicle to be tracked, through a sensor including a radar sensor, a LiDAR sensor, an ultrasonic sensor, or an image sensor. The sensor 100 may use most sensors, such as a radar sensor, a LiDAR sensor, an ultrasonic sensor, or an image sensor, for emitting a beam to track a vehicle. When the image sensor is used, the sensor 100 may recognize the type or the license plate of a vehicle to more precisely set a tracking gate through image analysis.

In the vehicle tracking system according to an embodiment of the present disclosure, the tracking gate may include a longitudinal gate and a transverse gate, and the tracking setter 300 may obtain the longitudinal size and the transverse size of the tracking gate through the movement information and the emission information to set the tracking gate for the vehicle to be tracked. The sensor beam emission information may include information about the angle of a sensor beam forming at a shortest distance with the vehicle to be tracked, among multiple sensor beams emitted toward the vehicle to be tracked. The movement information of the vehicle to be tracked may include information about the full length and the full width of the vehicle to be tracked or about the traveling direction of the vehicle to be tracked.

In the vehicle tracking system according to an embodiment of the present disclosure, the tracking setter 300 sets the tracking gate by using emission information of a sensor for emitting a sensor beam, that is, an angle which the sensor beam forms with a vehicle to be tracked, in addition to movement information of the vehicle to be tracked, that is, the heading of the vehicle.

Specifically, referring to FIG. 1, in the vehicle tracking system according to an embodiment of the present disclosure, the information calculator 200 obtains, through the sensor 100, the heading ($\alpha$) of the vehicle to be tracked, and obtains the emission direction ($\beta$) of a sensor beam by drawing an imaginary line between sensors at a point closest to the current position of the vehicle to be tracked. The reflection area of the sensor beam is proportional to $|\sin(\alpha-\beta)|$, and thus the reflection area is largest when $\alpha$ is at right angles to $\beta$, and the reflection area is smallest when $\alpha$ and $\beta$ have an identical direction. Therefore, the sizes of longitudinal and transverse tracking gates may be set as follows.

Longitudinal gate size: full width+(full length−full width)*$|\sin(\alpha-\beta)|$*$|\cos(\alpha)|$ Transverse gate size: full width+(full length−full width)*$|\sin(\alpha-\beta)|$*$|\sin(\alpha)|$ Thus, the reflection area varies depending on the full width and the full length of a vehicle, and therefore the information calculator 200 may recognize the type of the vehicle through the sensor 100 to store specifications in a database or may measure specifications to collect the full width and the full length of the vehicle, and may calculate the heading ($\alpha$) of the vehicle to be tracked and the emission direction ($\beta$) of the sensor beam. The tracking setter 300 may use the same to set a tracking gate to the reflection area of an actual sensor beam, thereby setting a tracking gate which is more accurate and optimized for each vehicle.

Therefore, thanks to the optimized tracking gate, noise may be prevented from being generated at a point other than the reflection area of the sensor beam, and the position, the speed, the heading, or the like of the vehicle to be tracked may be accurately tracked even in a cluttered environment in which multiple obstacles exist.

In the vehicle tracking system according to an embodiment of the present disclosure, the sensor 100 is arranged in a vehicle or an infrastructure, and the tracking setter 300 may set a tracking gate for a vehicle to be tracked around the vehicle or the infrastructure. Further, the infrastructure may be a fixed site including a parking lot, a road, a tollgate, or a gas station, and the sensor 100 may be disposed to face a point, through which surrounding vehicles pass, at the fixed site.

The vehicle tracking system according to an embodiment of the present disclosure may be disposed in a vehicle to track a vehicle to be tracked, which stops or passes therearound, or arranged in a fixed infrastructure, thereby preventing a collision and an accident. Particularly, the vehicle tracking system may effectively track a vehicle to be tracked through an optimized tracking gate in an environment in which reflection is severe or in an environment in which there are many obstacles such as a parking lot, a tollgate, or the like.

Further, in the vehicle tracking system according to an embodiment of the present disclosure, the tracking setter 300 may set at least one tracking gate for at least one vehicle to be tracked, and may track, using the at least one set tracking gate, the at least one vehicle to be tracked. In the case of using the vehicle tracking system according to an embodiment of the present disclosure, even when tracking multiple vehicles, optimized tracking gates are set for the respective vehicles to be tracked. Therefore, it is possible to minimize overlapping between the tracking gates for the respective vehicles to be tracked, and to also minimize noise caused by reflection of sensor beams from a vehicle or an obstacle other than the vehicle to be tracked or by mutual overlapping between the sensor beams in a cluttered environment.

FIG. 2 is a flowchart illustrating a vehicle tracking method according to an embodiment of the present disclosure. The vehicle tracking method according to an embodiment of the present disclosure includes: an emission step S100 of emitting a sensor beam toward a vehicle to be tracked; an information calculation step S120 of calculating sensor beam emission information and movement information of the vehicle to be tracked; and a tracking setting step S130 of setting, through the movement information and the emission information, a tracking gate for the vehicle to be tracked.

Further, in the vehicle tracking method according to an embodiment of the present disclosure includes, in the emission step S100, the sensor beam may be emitted toward a vehicle to be tracked, through a sensor which is arranged in a vehicle or an infrastructure and includes a radar sensor, a LiDAR sensor, an ultrasonic sensor, or an image sensor.

In the tracking setting step S130, the tracking gate may include a longitudinal gate and a transverse gate. In the tracking setting step S130, the tracking gate for the vehicle to be tracked may be set by obtaining the longitudinal size and the transverse size of the tracking gate through the movement information and the emission information.

Further, the vehicle tracking method according to an embodiment of the present disclosure may further include a tracking step S140 of tracking the vehicle to be tracked, by using the set tracking gate after the tracking setting step S130.

The apparatuses, devices, units, modules, and components described herein are implemented by hardware components. Examples of hardware components that may be used to perform the operations described in this application where appropriate include controllers, sensors, generators, drivers, memories, comparators, arithmetic logic units, adders, subtractors, multipliers, dividers, integrators, and any other electronic components configured to perform the operations described in this application. In other examples, one or more of the hardware components that perform the operations described in this application are implemented by computing hardware, for example, by one or more processors or computers. A processor or computer may be implemented by one or more processing elements, such as an array of logic gates, a controller and an arithmetic logic unit, a digital signal processor, a microcomputer, a programmable logic controller, a field-programmable gate array, a programmable logic array, a microprocessor, or any other device or combination of devices that is configured to respond to and execute instructions in a defined manner to achieve a desired result. In one example, a processor or computer includes, or is connected to, one or more memories storing instructions or software that are executed by the processor or computer. Hardware components implemented by a processor or computer may execute instructions or software, such as an operating system (OS) and one or more software applications that run on the OS, to perform the operations described in this application. The hardware components may also access, manipulate, process, create, and store data in response to execution of the instructions or software. For simplicity, the singular term "processor" or "computer" may be used in the description of the examples described in this application, but in other examples multiple processors or computers may be used, or a processor or computer may include multiple processing elements, or multiple types of processing elements, or both. For example, a single hardware component or two or more hardware components may be implemented by a single processor, or two or more processors, or a processor and a controller. One or more hardware components may be implemented by one or more processors, or a processor and a controller, and one or more other hardware components may be implemented by one or more other processors, or another processor and another controller. One or more processors, or a processor and a controller, may implement a single hardware component, or two or more hardware components. A hardware component may have any one or more of different processing configurations, examples of which include a single processor, independent processors, parallel processors, single-instruction single-data (SISD) multiprocessing, single-instruction multiple-data (SIMD) multiprocessing, multiple-instruction single-data (MISD) multiprocessing, multiple-instruction multiple-data (MIMD) multiprocessing, a controller and an arithmetic logic unit (ALU), a DSP, a microcomputer, an application-specific integrated circuit (ASIC), a field programmable gate array (FPGA), a programmable logic unit (PLU), a central processing unit (CPU), a graphics processing unit (GPU), a neural processing unit (NPU), or any other device capable of responding to and executing instructions in a defined manner.

The software may include a computer program, a piece of code, an instruction, or some combination thereof, to independently or uniformly instruct or configure the processing device to operate as desired. Software and data may be embodied permanently or temporarily in any type of machine, component, physical or pseudo equipment, computer storage medium or device, or in a propagated signal wave capable of providing instructions or data to or being interpreted by the processing device. The software also may be distributed over network-coupled computer systems so that the software is stored and executed in a distributed fashion. The software and data may be stored by one or more non-transitory computer-readable recording mediums.

The methods that perform the operations described in this application are performed by computing hardware, for example, by one or more processors or computers, implemented as described above executing instructions or software to perform the operations described in this application that are performed by the methods. For example, a single operation or two or more operations may be performed by a single processor, or two or more processors, or a processor and a controller. One or more operations may be performed by one or more processors, or a processor and a controller, and one or more other operations may be performed by one or more other processors, or another processor and another controller. One or more processors, or a processor and a controller, may perform a single operation, or two or more operations.

Instructions or software to control a processor or computer to implement the hardware components and perform the methods as described above are written as computer programs, code segments, instructions or any combination thereof, for individually or collectively instructing or configuring the processor or computer to operate as a machine or special-purpose computer to perform the operations performed by the hardware components and the methods as described above. In one example, the instructions or software include machine code that is directly executed by the processor or computer, such as machine code produced by a compiler. In an example, the instructions or software includes at least one of an applet, a dynamic link library (DLL), middleware, firmware, a device driver, an application program storing the lane recognition method. In another example, the instructions or software include higher-level code that is executed by the processor or computer using an interpreter. Programmers of ordinary skill in the art can readily write the instructions or software based on the block diagrams and the flow charts illustrated in the drawings and the corresponding descriptions in the specification, which disclose algorithms for performing the operations performed by the hardware components and the methods as described above.

The instructions or software to control a processor or computer to implement the hardware components and perform the methods as described above, and any associated data, data files, and data structures, are recorded, stored, or fixed in or on one or more non-transitory computer-readable storage media. Examples of a non-transitory computer-readable storage medium include read-only memory (ROM), random-access programmable read only memory (PROM), electrically erasable programmable read-only memory (EEPROM), random-access memory (RAM), magnetic RAM (MRAM), spin-transfer torque (STT)-M RAM, static random-access memory (SRAM), thyristor RAM (T-RAM), zero capacitor RAM (Z-RAM), twin transistor RAM (TTRAM), conductive bridging RAM (CBRAM), ferroelectric RAM (FeRAM), phase change RAM (PRAM), resistive RAM (RRAM), nanotube RRAM, polymer RAM (PoRAM), nano floating gate Memory (NFGM), holographic memory, molecular electronic memory device), insulator resistance change memory, dynamic random access memory (DRAM), static random access memory (SRAM), flash memory, non-volatile memory, CD-ROMs, CD-Rs, CD+Rs, CD-RWs, CD+RWs, DVD-ROMs, DVD-Rs, DVD+Rs, DVD-RWs, DVD+RWs, DVD-RAMs, BD-ROMs, BD-Rs, BD-R LTHs, BD-REs, blue-ray or optical disk storage, hard disk drive (HDD), solid state drive (SSD), flash memory, a card type memory such as multimedia card micro or a card (for example, secure digital (SD) or extreme digital (XD)), magnetic tapes, floppy disks, magneto-optical data storage devices, optical data storage devices, hard disks, solid-state disks, and any other device that is configured to store the instructions or software and any associated data, data files, and data structures in a non-transitory manner and providing the instructions or software and any associated data, data files, and data structures to a processor or computer so that the processor or computer can execute the instructions. In an example, the instructions or software and any associated data, data files, and data structures are distributed over network-coupled computer systems so that the instructions and software and any associated data, data files, and data structures are stored, accessed, and executed in a distributed fashion by the one or more processors or computers.

While this disclosure includes specific examples, it will be apparent after an understanding of the disclosure of this application that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner, and/or replaced or supplemented by other components or their equivalents. Therefore, the scope of the disclosure is defined not by the detailed description, but by the claims and their equivalents, and all variations within the scope of the claims and their equivalents are to be construed as being included in the disclosure.

What is claimed is:

1. A vehicle tracking system, comprising:
a sensor configured to emit a sensor beam toward a vehicle to be tracked; and
one or more processors configured to:
calculate sensor beam emission information, and movement information of the vehicle to be tracked, and
receive the movement information and the emission information and set a tracking gate for the vehicle to be tracked, wherein
the sensor beam emission information includes an angle which the sensor beam forms with the vehicle to be tracked,
wherein the movement information of the vehicle to be tracked comprises information about a full length and a full width of the vehicle to be tracked and information about a traveling direction of the vehicle to be tracked.

2. The system of claim 1, wherein the one or more processors is configured to calculate the sensor beam emission information and movement information of the vehicle to be tracked based on data received from the sensor.

3. The system of claim 1, wherein:
the sensor is configured to emit the sensor beam toward the vehicle to be tracked, and
the sensor comprises at least one of a radar sensor, a LiDAR sensor, an ultrasonic sensor, and an image sensor.

4. The system of claim 1, wherein the tracking gate comprises a longitudinal gate and a transverse gate, and the one or more processors is configured to receive a longitudinal size and a transverse size of the tracking gate based on the movement information and the emission information to set the tracking gate for the vehicle to be tracked.

5. The system of claim 1, wherein the sensor beam emission information comprises information about an angle of a sensor beam that forms a shortest distance with the vehicle to be tracked, among multiple sensor beams emitted toward the vehicle to be tracked.

6. The system of claim 1, wherein the sensor is disposed in a vehicle or an infrastructure, and the one or more processors is configured to set a tracking gate for the vehicle to be tracked around the vehicle or the infrastructure.

7. The system of claim 6, wherein the infrastructure is a fixed site comprising at least one of a parking lot, a road, a tollgate, and a gas station, and
the sensor is disposed to face an area through which surrounding vehicles pass, at the fixed site.

8. The system of claim 1, wherein the one or more processors is configured to set at least one tracking gate for at least one vehicle to be tracked; and track, based on the at least one set tracking gate, the at least one vehicle to be tracked.

9. A vehicle tracking method, comprising:
emitting a sensor beam toward a vehicle to be tracked;
calculating sensor beam emission information and movement information of the vehicle to be tracked; and
setting a tracking gate for the vehicle to be tracked based on the calculated movement information and the calculated emission information, wherein
the sensor beam emission information includes an angle which the sensor beam forms with the vehicle to be tracked,
wherein the movement information of the vehicle to be tracked comprises information about a full length and a full width of the vehicle to be tracked and information about a traveling direction of the vehicle to be tracked.

10. The method of claim 9, wherein the sensor beam is configured to be emitted toward the vehicle to be tracked, through a sensor which is arranged in one of a vehicle and an infrastructure, and
wherein the sensor comprises at least one of a radar sensor, a LIDAR sensor, an ultrasonic sensor, and an image sensor.

11. The method of claim 9, wherein the tracking gate comprises a longitudinal gate and a transverse gate, and,
the tracking gate for the vehicle to be tracked is set by receiving a longitudinal size and a transverse size of the tracking gate based on the movement information and the emission information.

12. The method of claim 9, wherein the vehicle to be tracked is tracked by implementing the set tracking gate after the tracking setting.

13. A method of tracking a vehicle, comprising:
emitting a sensor beam toward a vehicle to be tracked;
calculating an angle which the sensor beam forms with the vehicle to be tracked and a length and width of the vehicle to be tracked; and
setting a tracking gate for the vehicle to be tracked based on the angle that the sensor beam forms with the vehicle to be tracked and the length and width of the vehicle to be tracked.

14. The method of claim 13, wherein the length and width of the vehicle is determined by detecting a type of the vehicle to be tracked.

15. The method of claim 13, further comprising detecting a travelling direction of the vehicle to be tracked and setting the tracking gate for the vehicle to be tracked based on the detected travelling direction.

* * * * *